United States Patent
Hatfield et al.

(10) Patent No.: US 9,604,175 B2
(45) Date of Patent: Mar. 28, 2017

(54) THREE-WAY CATALYST SYSTEMS INCLUDING NB—ZR—AL-MIXED OXIDE SUPPORTS, BA—PD, AND RH—FE MATERIAL COMPOSITIONS

(71) Applicant: Clean Diesel Technologies, Inc., Oxnard, CA (US)

(72) Inventors: Randal L. Hatfield, Port Hueneme, CA (US); Zahra Nazarpoor, Camarillo, CA (US); Johnny T. Ngo, Oxnard, CA (US); Edward J. Lee, Oxnard, CA (US); Stephen J. Golden, Santa Barbara, CA (US)

(73) Assignee: Clean Diesel Technologies, Inc., Oxnard, CA (US)

(*) Notice: Subject to any disclaimer, the term of this patent is extended or adjusted under 35 U.S.C. 154(b) by 105 days.

(21) Appl. No.: 14/732,499

(22) Filed: Jun. 5, 2015

(65) Prior Publication Data
US 2015/0352494 A1    Dec. 10, 2015

Related U.S. Application Data

(60) Provisional application No. 62/163,231, filed on May 18, 2015, provisional application No. 62/008,674, filed on Jun. 6, 2014.

(51) Int. Cl.
*B01D 50/00*    (2006.01)
*B01D 53/94*    (2006.01)
(Continued)

(52) U.S. Cl.
CPC ....... *B01D 53/9472* (2013.01); *B01D 53/945* (2013.01); *B01D 53/9454* (2013.01);
(Continued)

(58) Field of Classification Search
CPC ......... F01N 3/28; B01J 23/002; B01J 27/232; B01D 2255/2068; B01D 2255/1023; B01D 53/945
(Continued)

(56) References Cited

U.S. PATENT DOCUMENTS

2008/0038172 A1* 2/2008 Chen .................... B01D 53/945
                                                          423/213.2
2010/0240525 A1* 9/2010 Golden ................ B01D 53/945
                                                          502/65
(Continued)

*Primary Examiner* — Tom P Duong
(74) *Attorney, Agent, or Firm* — Alston & Bird LLP

(57) ABSTRACT

The present disclosure describes zoned three way catalyst (TWC) systems including Rhodium-iron overcoat layers and Nb—Zr—Al Oxide overcoat layers. Disclosed herein are TWC sample systems that are configured to include a substrate and one or more of a washcoat layer, an impregnation layer, and/or an overcoat layer. In catalyst systems disclosed herein, closed-coupled catalysts include a first catalyst zone with an overcoat layer formed using a slurry that includes an oxide mixture and an Oxygen Storage Material (OSM). In catalyst systems disclosed herein, oxide mixtures include niobium oxide ($Nb_2O_5$), zirconia, and alumina. Further, catalyst systems disclosed herein include a second catalyst zone with an overcoat layer formed to include a rhodium-iron catalyst. Yet further, catalyst systems disclosed herein include impregnation layers that include one or more of Palladium, Barium, Cerium, Neodymium, and Rhodium.

20 Claims, 4 Drawing Sheets

(51) Int. Cl.
| | |
|---|---|
| *B01J 23/00* | (2006.01) |
| *B01J 23/89* | (2006.01) |
| *B01J 35/04* | (2006.01) |
| *B01J 21/04* | (2006.01) |
| *B01J 23/10* | (2006.01) |
| *B01J 23/20* | (2006.01) |
| *B01J 23/63* | (2006.01) |
| *B01J 27/232* | (2006.01) |
| *B01J 35/00* | (2006.01) |

(52) U.S. Cl.
CPC ............ *B01J 21/04* (2013.01); *B01J 23/002* (2013.01); *B01J 23/10* (2013.01); *B01J 23/20* (2013.01); *B01J 23/63* (2013.01); *B01J 23/894* (2013.01); *B01J 23/8906* (2013.01); *B01J 27/232* (2013.01); *B01J 35/0006* (2013.01); *B01J 35/04* (2013.01); *B01D 2255/1023* (2013.01); *B01D 2255/1025* (2013.01); *B01D 2255/207* (2013.01); *B01D 2255/209* (2013.01); *B01D 2255/2042* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/2092* (2013.01); *B01D 2255/20715* (2013.01); *B01D 2255/20738* (2013.01); *B01D 2255/40* (2013.01); *B01D 2255/902* (2013.01); *B01D 2255/908* (2013.01); *B01J 2523/00* (2013.01); *Y02T 10/22* (2013.01)

(58) Field of Classification Search
USPC ...... 422/169, 170; 60/274; 502/65, 303, 304
See application file for complete search history.

(56) References Cited

U.S. PATENT DOCUMENTS

| | | | | |
|---|---|---|---|---|
| 2012/0128557 | A1* | 5/2012 | Nunan | B01D 53/945 423/213.5 |
| 2012/0128558 | A1* | 5/2012 | Nunan | B01D 53/945 423/213.5 |
| 2014/0301931 | A1* | 10/2014 | Nazarpoor | B01J 23/83 423/245.1 |
| 2014/0334989 | A1* | 11/2014 | Nazarpoor | B01D 53/944 422/177 |
| 2015/0148223 | A1* | 5/2015 | Nazarpoor | B01J 23/8986 502/324 |
| 2015/0148225 | A1* | 5/2015 | Nazarpoor | B01J 23/8986 502/324 |

* cited by examiner

US 9,604,175 B2

THREE-WAY CATALYST SYSTEMS INCLUDING NB—ZR—AL-MIXED OXIDE SUPPORTS, BA—PD, AND RH—FE MATERIAL COMPOSITIONS

CROSS-REFERENCE TO RELATED APPLICATIONS

The present disclosure claims the benefit of U.S. Provisional Patent Application Ser. No. 62/008,674, titled "Rhodium-Iron Catalysts", filed Jun. 6, 2014, and U.S. Provisional Patent Application Ser. No. 62/163,231, filed May 18, 2015, titled "Systems and Apparatuses for Rhodium-Iron Catalysts", the entireties of which are incorporated by reference herein.

The present application is also related to U.S. patent application Ser. No. 14/732379, filed Jun. 5, 2015, titled "Nb—Zr—-Al-Mixed Oxide Supports for Rh Layer use in TWC Converters", and U.S. patent application Ser. No. 14/732473, filed Jun. 5, 2015, titled "Three-way Catalyst Systems Including Ba-Pd and Rh—Fe Material Compositions," each of which are incorporated by reference herein in their entireties.

BACKGROUND

Field of the Disclosure

The present disclosure relates in general to materials of use in catalytic converters, and more specifically, to catalyst structures of use in three-way catalytic (TWC) converters.

Background Information

Current automotive catalysts largely depend on platinum group metals (e.g. Platinum, Palladium, and Rhodium) in order to convert vehicle emissions to less noxious substances. However, the supply of said metals is limited even as automobile production increases as a larger portion of the world population adopts motorized vehicles for personal transport. Additionally, environmental concerns have led to ever more stringent NOx, CO, hydrocarbon, and particulate emission regulations being implemented in countries worldwide. Furthermore, a number of automakers are adopting technologies that reduce engine exhaust temperatures to improve thermal efficiencies and particle emissions, resulting in more difficult conditions in which catalysts operate.

As such, there is a continuing need for catalysts able to provide better catalytic performance while maintaining reasonable use of catalytic materials.

SUMMARY

The present disclosure describes catalyst systems that include Rhodium Iron catalysts, Barium Palladium catalysts, and Nb—Zr—Al Mixed Oxides.

In some embodiments, Three-Way Catalysts (TWCs) are configured to include a substrate and one or more of a washcoat layer, an impregnation layer, and/or an overcoat layer. In these embodiments, the washcoat layer is deposited onto the substrate, the impregnation layer is deposited onto the washcoat layer, and the overcoat layer is deposited onto the washcoat/impregnation layer.

In some embodiments, TWC systems include a close-coupled converter system that includes a first catalyst zone and a second catalyst zone. In these embodiments, said first catalyst zone and second catalyst zone within said close-coupled converter system each include a washcoat layer, an impregnation layer, and an overcoat layer. In these embodiments, one or more washcoat layers include one or more of an oxygen storage material (OSM) and a refractory support oxide. In these embodiments, said slurry can include an OSM including one or more of Ceria, Zirconia, Neodymia, Yttria, and the like. Further to these embodiments, said slurry can include a refractory support oxide, such as for example a doped alumina. In these embodiments, one or more impregnation layers are formed using one or more of palladium nitrate, barium acetate, cerium acetate, neodymium acetate, and the like. Further to these embodiments, one or more overcoat layers include one or more of an Iron/OSM powder, an OSM, and/or a Nb—Zr—Al oxide mixture. Yet further to these embodiments, said overcoat layers are treated with rhodium nitrate and include rhodium at a desired loading concentration.

In some embodiments, samples are produced for catalytic performance comparisons and to ascertain the effect of varying TWC system configurations on catalytic performance. In these embodiments the samples, include, but are not limited to reference samples made using conventional materials and synthesis methods. Said samples additionally include samples having a washcoat formed with a slurry that includes an OSM and a support oxide, e.g. including 40 percent by weight a fluorite phase Cerium Zirconium Neodymium Yttrium (CZNY) OSM that includes 31 wt % Cerium Oxide, 58.3 wt % Zirconium-Hafnium Oxide, 5.5 wt % Neodymium Oxide, and 5.2 wt % Yttrium Oxide, and including 40 wt % a support oxide, e.g. a Lanthanum Oxide ($La_2O_3$) doped alumina; samples further including a first impregnation layer on a first catalyst zone, said first impregnation layer including palladium at a loading concentration within a range from about 22 grams per cubic foot ($g/ft^3$) to about 90 $g/ft^3$, barium at a loading concentration within a range from about 115.2 $g/ft^3$ to about 691.3 $g/ft^3$, cerium at a loading concentration of approximately 105.8 $g/ft^3$, and neodymium at a loading concentration of approximately 12.1 $g/ft^3$; samples further including a first impregnation on a second catalyst zone, said first impregnation including palladium at a loading concentration within a range from about 0 grams per $g/ft^3$ to about 25 $g/ft^3$, barium at a loading concentration of approximately 115.2 $g/ft^3$, cerium at a loading concentration of approximately 105.8 $g/ft^3$, and neodymium at a loading concentration of approximately 12.1 $g/ft^3$; samples further including a second impregnation layer on a first catalyst zone, said second impregnation layer including palladium at a loading concentration within the range of about 0 $g/ft^3$ to about 147 $g/ft^3$; samples further including an overcoat formed on a singular catalyst zone or a second catalyst zone, said overcoat including a rhodium iron catalyst that includes a CZNY OSM, said CZNY including 31 wt % Cerium Oxide, 58.3 wt % Zirconium-Hafnium Oxide, 5.5 wt % Neodymium Oxide, and 5.2 wt % Yttrium Oxide, said CZNY OSM having been treated with Iron Nitrate and Rhodium nitrate such that the iron loading concentration is within a range from 210 $g/ft^3$ to 310 $g/ft^3$ and the rhodium loading concentration is within a range from about 3.0 $g/ft^3$ to 3.6 $g/ft^3$; and samples further including an overcoat formed on a first catalyst zone, said overcoat including rhodium supported on a mixture of 40 wt % CZNY OSM and 60 wt % Nb—Zr—Al oxide mixture, said OSM including 31 wt % Cerium Oxide, 58.3 wt % Zirconium-Hafnium Oxide, 5.5 wt % Neodymium Oxide, and 5.2 wt % Yttrium Oxide, said Nb—Zr—Al oxide mixture including niobium oxide at approximately 10 wt %, zirconia at approximately 20 wt %, and alumina for the remaining amount, and rhodium included at a loading concentration of about 3 $g/ft^3$ to about 3.6 $g/ft^3$.

In other embodiments, the catalytic efficiency of TWC systems employing various catalytic materials is evaluated by performing a light-off test to determine the Temperature at which 50% Conversion (T50) and the Temperature at which 90% conversion (T90) of pollutants including Nitrogen Oxides (NOx), Carbon Monoxide (CO), and Hydrocarbons (HC) is achieved. In these embodiments, the T50 and T90 conversion values associated with a catalyst are evaluated by providing a core sample from the catalyst (e.g., by using a diamond core drill), experimentally aging the core sample using heat in a controlled chemical environment, and testing said core sample with a bench flow reactor to determine TWC performance.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
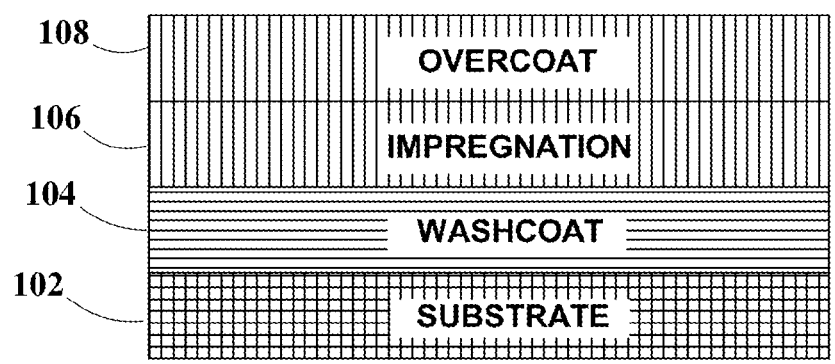
FIG. 1 is a graphical representation illustrating a catalyst structure used for Three-Way Catalyst (TWC) samples including a substrate and one or more of a washcoat layer, an impregnation layer, and/or an overcoat layer, according to an embodiment.

The present disclosure is described herein in detail with reference to embodiments illustrated in the drawings, which form a part hereof. Other embodiments may be used and/or other modifications may be made without departing from the scope or spirit of the present disclosure. The illustrative embodiments described in the detailed description are not meant to be limiting of the subject matter presented.

Definitions

As used here, the following terms have the following definitions:

"Air/Fuel ratio or A/F ratio" refers to the mass ratio of air to fuel present in a combustion process.

"Calcination" refers to a thermal treatment process applied to solid materials, in presence of air, to bring about a thermal decomposition, phase transition, or removal of a volatile fraction at temperatures below the melting point of the solid materials.

"Catalyst" refers to one or more materials that may be of use in the conversion of one or more other materials.

"Catalyst system" refers to any system including a catalyst, such as, a PGM catalyst or a ZPGM catalyst of at least two layers comprising a substrate, a washcoat and/or an overcoat.

"Conversion" refers to the chemical alteration of at least one material into one or more other materials.

"Lean condition" refers to exhaust gas condition with an R value less than 1,excess oxidants.

"Platinum group metals (PGM)" refers to platinum, palladium, ruthenium, iridium, osmium, and rhodium.

"R value" refers to the value obtained by dividing the total reducing potential of the gas mixture (in Moles of Oxygen) by the total oxidizing potential of the gas mixture (in moles of Oxygen).

"Rich condition" refers to exhaust gas condition with an R value greater than 1,excess reductants.

"Synthesis method" refers to a process by which chemical reactions and/or mixing occur to form a catalyst from different precursor materials.

"$T_{50}$" refers to the temperature at which 50% of a material is converted.

"$T_{90}$" refers to the temperature at which 90% of a material is converted.

"Three-Way Catalyst" refers to a catalyst able to perform the three simultaneous tasks of reduction of nitrogen oxides to nitrogen, oxidation of carbon monoxide to carbon dioxide, and oxidation of unburnt hydrocarbons to carbon dioxide and water.

Description of the Drawings

The present disclosure describes catalyst compositions, including Rhodium and Iron, of use in Three Way Catalysts (TWCs).

Catalyst Structure

FIG. 1 is a graphical representation illustrating a catalyst structure used for Three-Way Catalyst (TWC) samples including a substrate and one or more of a washcoat layer, an impregnation layer, and/or an overcoat layer, according to an embodiment. In FIG. 1, TWC Structure 100 includes Substrate 102, Washcoat Layer 104, Impregnation Layer 106, and Overcoat Layer 108. In some embodiments, Washcoat Layer 104 is deposited onto Substrate 102, Impregnation Layer 106 is deposited on top of/into Washcoat Layer 104, and Overcoat Layer 108 is deposited onto Impregnation Layer 106. In other embodiments, TWC Structure 100 can include additional, fewer, or differently arranged components and layers than those illustrated in FIG. 1.

In some embodiments, Substrate 102 is implemented as a ceramic monolith substrate. In these embodiments, Substrate 102 is of a diameter, wall thickness, and cell density suitable for use in a desired application. In an example, Substrate 102 is implemented as a cordierite monolith having a diameter in the range from about 4.16 inches to about 4.66 inches. In this example, Substrate 102 is implemented as having a wall thickness in the range from about 3.5 mils to about 4.3 mils. Further to this example, Substrate 102 is implemented as having a cell density of approximately 600 cells per square inch (CPSI).

In some embodiments, Washcoat Layer 104 is implemented as a layer including one or more of an oxygen storage material and a refractory support oxide. In these embodiments, Washcoat Layer 104 is formed by coating a substrate with a slurry at a desired coating concentration. In some embodiments, said slurry includes an oxygen storage material including one or more of Ceria, Zirconia, Neodymia, Yttria, and the like. In other embodiments, said slurry includes a refractory support oxide, such as, for example a doped alumina. In these embodiments, the coated substrate is then calcined at a desired temperature.

In an example, Washcoat Layer 104 is formed by coating Substrate 102 with a slurry at a loading of approximately 180 grams per liter (g/l). In some embodiments, said slurry includes a Cerium Zirconium-Hafnium Neodymium Yttrium (CZNY) oxygen storage material (OSM) and a lanthanum doped alumina. In this example, said CZNY OSM is a fluorite phase OSM including 31 wt % Cerium Oxide, 58.3 wt % Zirconium-Hafnium Oxide, 5.5 wt % Neodymium Oxide, and 5.2 wt % Yttrium Oxide. Further to this example, said lanthanum doped alumina is a high surface area alumina doped with $La_2O_3$ and stabilized at a high temperature. In these embodiments, after coating Substrate 102 with said slurry, Substrate 102 is calcined for approximately four hours at about 550° C.

In some embodiments, Impregnation Layer 106 is implemented as a layer including one or more catalyst compositions, said layer being formed over Washcoat Layer 104. In these embodiments, said catalyst compositions include one or more of a PGM and/or non-precious metals. In an example, Substrate 102 having Washcoat Layer 104 is impregnated with a water-based solution including one or more of palladium nitrate, barium acetate, cerium acetate, and neodymium acetate, followed by calcination at around 550 ° C. In this example, said solution includes palladium nitrate at a loading concentration within a range from about 0 $g/ft^3$ to about 147 $g/ft^3$, barium acetate at a loading concentration within a range from about 115 $g/ft^3$ to about 691 $g/ft^3$, cerium acetate at a loading of approximately 106 $g/ft^3$, and neodymium acetate at a loading of approximately 12.1 $g/ft^3$.

In some embodiments, Overcoat Layer 108 is implemented as a layer formed over a substrate coated with one or more of Washcoat Layer 104 and/or Impregnation Layer 106. In these embodiments, said substrate is coated with a slurry at a desired loading, said slurry being treated with rhodium nitrate and including one or more of an Iron/OSM powder, an OSM, and/or a Nb—Zr—Al oxide mixture. In these embodiments, the coated substrate is then calcined at a desired temperature. In a first example, Overcoat Layer 108 is formed by coating Substrate 102, where Washcoat Layer 104 and Impregnation Layer 106 have been previously applied, with a slurry at a loading of approximately 100 g/L. In this example, said slurry includes an Iron and CZNY OSM powder, and rhodium nitrate. Further to this example, said Iron/OSM powder includes an iron loading concentration within a range from about 210 $g/ft^3$ to about 310 $g/ft^3$ and a rhodium loading concentration within a range from about 3 $g/ft^3$ to about 3.6 $g/ft^3$. In a second example, said slurry includes a 60 percent by weight (wt %) Nb—Zr—Al oxide mixture and 40 wt % OSM. In this example, rhodium is added to said slurry as rhodium nitrate at a desired loading concentration. Further to this example, said Nb—Zr—Al oxide mixture includes niobium oxide at approximately 10 wt %, zirconia at approximately 20 wt %, and alumina for the remaining amount. Yet further to this example, said OSM is implemented as a fluorite phase CZNY OSM that includes 31 wt % Cerium Oxide, 58.3 wt % Zirconium-Hafnium Oxide, 5.5 wt % Neodymium Oxide, and 5.2 wt % Yttrium Oxide. Yet further to this embodiment, said slurry includes rhodium at a loading concentration within a range from about 15 $g/ft^3$ to about 24 $g/ft^3$.

Figure 2:
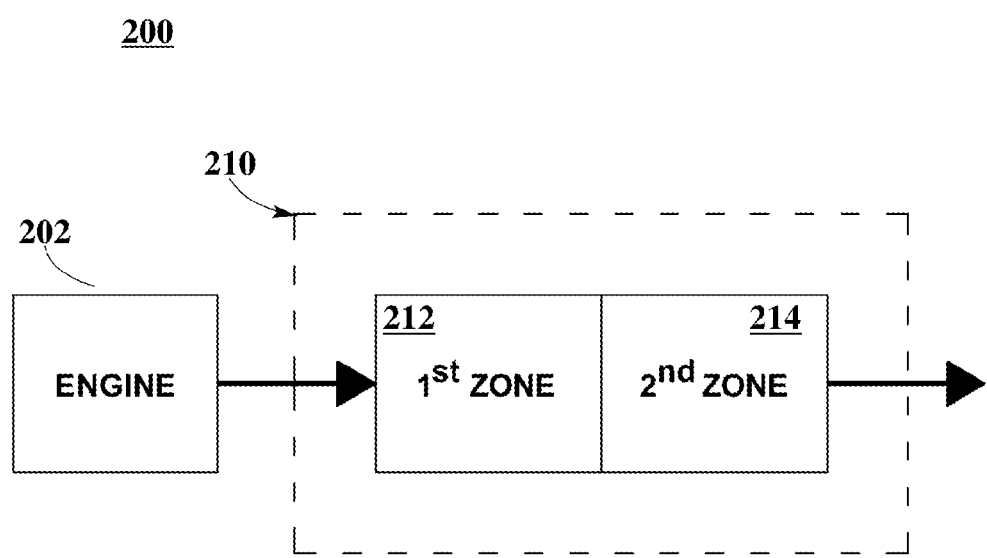
FIG. 2 is a block diagram illustrating a Thee-Way Catalyst (TWC) system structure including a first and second zone, according to an embodiment.

FIG. 2 is a block diagram illustrating a Thee-Way Catalyst (TWC) system structure including a first and second zone, according to an embodiment. In FIG. 2, Engine System 200 includes Engine 202 and Close-Coupled Converter System 210, where Close-Coupled Converter System 210 further includes a First Catalyst Zone 212 and a Second Catalyst Zone 214. In FIG. 2, Engine 202 is mechanically coupled and fluidically connected to Close-Coupled Converter System 210.

In some embodiments, Close-Coupled Converter System 210, is configured to receive exhaust gases from Engine 202, process the received gases, and expel said processed gases into another TWC converter, not shown, or into the atmosphere. In these embodiments, First Catalyst Zone 212 within Close-Coupled Converter System 210 is configured to receive exhaust gases from Engine 202, process the received gases into first treated gases, and expel the first treated gases into Second Catalyst Zone 214 for additional processing. Further to these embodiments, Second Catalyst Zone 214 within Close-Coupled Converter System 210 is configured to receive first treated gases from First Catalyst Zone 212, process the received first treated gases into second treated gases, and expel the second treated gases, such as, for example to an underfloor portion of the exhaust system (not shown). In some embodiments, First Catalyst Zone 212 and Second Catalyst Zone 214 within Close-Coupled Converter System 210 each include a substrate layer, a washcoat layer, an impregnation layer, and an overcoat layer formed using techniques substantially similar to those described in FIG. 1, above.

In other embodiments, Engine System 200 can include additional, fewer, or differently arranged components and layers than those illustrated in FIG. 2. For example, a conventional turbocharger, not shown, may be placed in between Engine 202 and Close-Coupled Converter System 210. In this example, said turbocharger is mechanically coupled and fluidically connected to Engine 202 and Close-Coupled Converter System 210. In another example, one or more of an additional close-coupled catalyst system and/or an underfloor catalyst system may be mechanically coupled and fluidically connected to Close-Coupled Converter System 210. In this example, said additional close-coupled catalyst system and/or underfloor catalyst system is configured to receive treated exhaust gases from Close-Coupled Converter System 210, process said treated exhaust gases into further treated exhaust gases, and expel said further treated exhaust gases.

Catalyst Testing Methodology

In some embodiments, the catalytic efficiency of TWC systems employing various catalytic materials is evaluated by performing a light-off test to determine the Temperature at which 50% Conversion (T50) of pollutants including Nitrogen Oxides (NOx), Carbon Monoxide (CO), and Hydrocarbons (HC) is achieved. In other embodiments, the catalytic efficiency of TWC systems employing various catalytic materials is further evaluated by performing a light-off test to determine the Temperature at which 90% Conversion (T90) of pollutants including NOx, CO, and HC is achieved.

In some embodiments, the T50 and T90 conversion values associated with a catalyst are evaluated by providing a core sample from the catalyst (e.g., by using a diamond core drill). In these embodiments, the core sample is then experimentally aged using heat in a controlled chemical environment. Further to these embodiments, the experimental aging simulates the aging of a catalyst associated with driving a vehicle an approximated number of miles. In an example, 1 inch diameter cores with a length of 2 inches are aged at 1000° C. in a chemical environment including 10 percent by mole (mol %) water vapor, 10 mol % carbon dioxide, varying amounts of carbon monoxide and oxygen, and nitrogen for the remaining amount. In this example, the experimental aging process simulates the thermal aging associated with driving a vehicle from about 50,000 miles to 120,000 miles. Further to this example, the experimental aging process includes simulations of both fuel cut like events (e.g., high oxygen content) and rich events (e.g., below 13 Air/Fuel (A/F) ratio units). In this example, the cores are then cooled in said chemical environment to a temperature ranging from about 200° C. to about 300° C. and are then removed from the experimental aging system.

In some embodiments, said core sample is tested on a bench flow reactor to determine TWC performance (e.g., T50, T90, etc.). In these embodiments, to perform a light-off test the core is conditioned in said bench flow reactor for at least 10 minutes at approximately 600° C. and exposed to a slightly rich gas stream (e.g., R-value of 1.05) with nearly symmetric lean and rich perturbations at a frequency of 1 Hz. In an example, a light-off test is used to determine catalytic performance. In this example, the gas stream used for the test includes 8000 ppm carbon monoxide, 2,000 ppm hydrogen, 400 ppm (C3) propene, 100 ppm (C3) propane, 1000 ppm nitric oxide, 100,000 ppm water vapor, 100,000 ppm carbon dioxide, and nitrogen for the remaining amount. Further to this example, the oxygen level additionally included in the gas stream is varied, as a square wave, from 4234 ppm to 8671 ppm with a frequency of 0.5 Hz. Still further to this example, the average R-value for the gas stream is 1.05 and the square wave change in oxygen results in an air to fuel ratio span of about 0.4 A/F units. In this example, the space velocity is about 90,000 $h^1$ at the standard conditions of 21.1° C., 1 atm with the total volume enclosed by the monolith surface used as the volume for the space velocity calculation. In another example, the gas feed employed for the test may be a standard TWC gas composition, with variable O2 concentration in order to adjust R-value from rich condition to lean condition during testing. In this example, the standard TWC gas composition includes about 8,000 ppm of CO, about 400 ppm of $C_3H_6$, about 100 ppm of $C_3H_8$, about 1,000 ppm of NOx, about 2,000 ppm of $H_2$, about 10% of $CO_2$, and about 10% of $H_2O$. The quantity of $O_2$ in the gas mix is varied to adjust the Air/Fuel (A/F) ratio within the range of R-values to test the gas stream. In yet another example, the temperature is stabilized at approximately 100 ° C. for about 2 minutes, and the gas temperature is increased/ramped at approximately 40° C. per minute to approximately 500° C. In this example, a gas blanket warming the core holder is increased/ramped at the substantially same set point temperature. Further to this example, the conversion of the gas pollutants is then measured and the temperature values at approximately 50% and 90% of conversion are determined.

Catalysts Tested

In some embodiments, a reference sample is produced for catalytic activity comparisons and to ascertain the catalytic conversion efficiency of the materials disclosed herein. In these embodiments, a reference sample (REF #1) is produced using conventional materials and synthesis methods. In an example, a cordierite substrate having a diameter of approximately 4.16 inches, a cell density of approximately 400 cells per square inch (CPSI), and a wall thickness of approximately 3.5 mils is coated with a slurry including an OSM (e.g. a fluorite phase Cerium Zirconium Neodymium Yttrium, CZNY, OSM) and alumina and calcined for about 4 hours at approximately 550° C., thereby forming a washcoat. In this example, said washcoat is then impregnated with barium acetate, neodymium acetate, cerium acetate, and palladium nitrate, forming an impregnated washcoat. Further to this example, a second slurry that includes an OSM, stabilized zirconia, and rhodium (employed as rhodium nitrate) is applied over said impregnated washcoat, followed by calcination for about 4 hours at approximately 550° C., thereby forming an overcoat layer. Yet further to this example, palladium and rhodium are present within catalyst REF #1 at a loading concentration of 94.7 $g/ft^3$ and 7.3 $g/ft^3$, respectively. In some embodiments, the resulting catalysts are comparable to a commercially available SULVER30 close-coupled catalyst.

In other embodiments, a set of samples are produced for catalytic performance comparisons and to ascertain the effect of a zoned close-coupled converter (CCC) system within TWC systems including a Nb—Zr—Al oxide mixture as an overcoat layer within the first catalyst zone and a rhodium-iron catalyst as an overcoat layer within the second catalyst zone. In these embodiments a First Catalyst (Type R), a second catalyst (Type S), and a third catalyst (Type T) are produced using methods substantially similar to those described in FIGS. 1 and 2. Further to these embodiments, catalysts Type R and S include a 1 L cordierite substrate having a 4.66 inch diameter, 600 CPSI cell density, and a 3.5 mils wall thickness coated with a slurry that includes a 40 wt % CZNY OSM and 60% doped alumina at a loading of about 180 g/l. Yet further to these embodiments, catalyst Type T includes a 0.455 L cordierite substrate having a 4.16 inch diameter, 400 CPSI cell density, and a 4.3 mils wall thickness coated with a slurry that includes a 40 wt % CZNY OSM and 60% doped alumina with a loading of about 180 g/l. In these embodiments, said CZNY OSM is a fluorite phase OSM that includes 31 wt % Cerium Oxide, 58.3 wt % Zirconium-Hafnium Oxide, 5.5 wt % Neodymium Oxide, and 5.2 wt % Yttrium Oxide. Further to these embodiments, said doped alumina is a Lanthanum Oxide ($La_2O_3$) doped alumina. Yet further to these embodiments, the coated substrate is then calcined to achieve adhesion of the ceramic-coating layer onto the cordierite substrate, thereby forming a washcoat layer.

In these embodiments, the substrates associated with catalysts Type R and S are then impregnated with: palladium nitrate at a loading concentration of 90 $g/ft^3$ for a first catalyst zone and at a loading concentration of 25 $g/ft^3$ for a second catalyst zone; barium acetate at a loading concentration of 691.3 $g/ft^3$ for said first catalyst zone and 115.2 $g/ft^3$ in said second catalyst zone in catalysts Type R and S; cerium acetate at a loading concentration of 105.8 $g/ft^3$ for said first catalyst zone and second catalyst zone in catalysts Type R and S; and neodymium acetate at a loading concentration of 12.1 $g/ft^3$ for said first catalyst zone and second catalyst zone in catalysts Type R and S. Further to these embodiments, the substrates are then calcined for approximately four hours at about 550° C., and after calcination a second impregnation layer including palladium nitrate at a loading concentration of 70 $g/ft^3$ and 147 $g/ft^3$ is applied to said first catalyst zone in catalysts Type R and S, respectively. In other embodiments, the substrate associated with catalyst Type T and having a single catalyst zone is then impregnated with: palladium nitrate at a loading concentration of 22 $g/ft^3$; barium acetate at a loading concentration of 115.2 $g/ft^3$; cerium acetate at a loading concentration of 105.8 $g/ft^3$; and neodymium acetate at a loading concentration of 12.1 $g/ft^3$. In these embodiments, the substrates are then calcined for approximately four hours at about 550 ° C., forming an impregnation layer.

Further to these embodiments, an overcoat layer is then applied onto the substrates associated with catalysts Type R, S, and T. In these embodiments, a slurry applied to a first catalyst zone associated with catalysts Type R and S at a loading of 100 g/l include 40 wt % CZNY OSM and 60 wt % Nb—Zr—Al oxide mixture. Further to these embodiments, said CZNY OSM is a fluorite phase OSM that includes 31 wt % Cerium Oxide, 58.3 wt % Zirconium-Hafnium Oxide, 5.5 wt % Neodymium Oxide, and 5.2 wt % Yttrium Oxide; and said Nb—Zr—Al oxide mixture includes niobium oxide at approximately 10 wt %, zirconia at approximately 20 wt %, and alumina for the remaining amount. Yet further to these embodiments, said slurry additionally includes rhodium, employed as rhodium nitrate, at a loading concentration of 15.1 g/ft³ for catalyst Type R and 24 g/ft³ for catalyst Type S. In other embodiments, a slurry applied to a second catalyst zone associated with catalysts Type R and S and a single catalyst zone associated with catalyst Type T at a loading of 100 g/l includes an Iron/OSM powder and rhodium nitrate. In these embodiments, said Iron/OSM powder includes a CZNY OSM power, said CZNY OSM powder having previously been treated with iron at a loading concentration of 310 g/ft³ for catalysts Type R and S, and at a loading concentration of 210 g/ft³ for catalyst Type T. Further to these embodiments, said CZNY OSM is a fluorite phase OSM that includes 31 wt % Cerium Oxide, 58.3 wt % Zirconium-Hafnium Oxide, 5.5 wt % Neodymium Oxide, and 5.2 wt % Yttrium Oxide. Yet further to these embodiments, said slurry additionally includes rhodium, employed as rhodium nitrate, at a loading concentration of 3 g/ft³ for catalysts Type R and S, and 3.6 g/ft³ for catalyst Type T. In these embodiments, the substrates are then calcined for approximately four hours at about 550° C., forming an overcoat layer including one or more catalyst zones.

TABLE 1

T50 values and T90 values for catalysts Type R, Type S, Type T, and REF#1.

|   | T50 | | | T90 | | |
|---|---|---|---|---|---|---|
|   | NOx | CO | HC | NOx | CO | HC |
| R | 235.3 | 232.3 | 243.6 | 258.3 | 243.6 | 271.6 |
| S | 226.0 | 225.1 | 237.1 | 245.3 | 237.1 | 261.1 |
| T | 259.0 | 254.2 | 275.7 | 296.6 | 271.4 | 331.7 |
| REF#1 | 260.8 | 260.0 | 277.9 | 295.9 | 282.4 | 302.6 |

Figure 3:
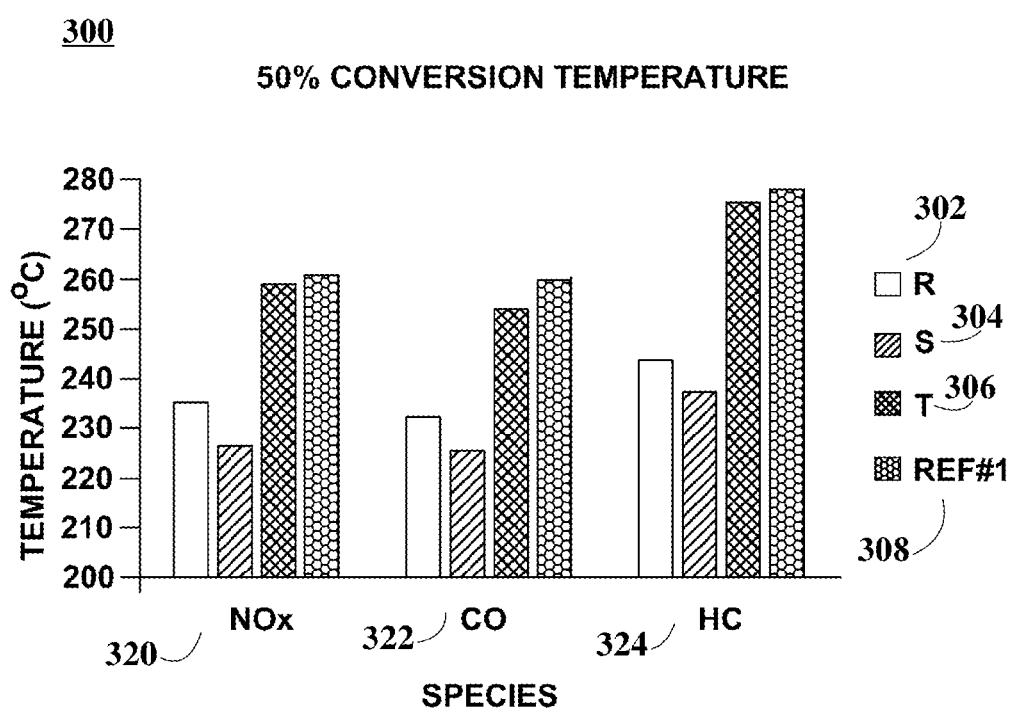
FIG. 3 is a graphical representation illustrating a comparison of T50 values of NOx, CO, and HC for REF #1 and Type R, S, and T Catalysts, according to an embodiment.

FIG. 3 is a graphical representation illustrating a comparison of T50 values of NOx, CO, and HC for REF #1 and Catalysts Type R, S, and T (see Table 1), according to an embodiment. In FIG. 3, T50 Chart 300 illustrates the 50% conversion temperature for NOx 320, CO 322, and HC 324 associated with each catalyst for catalysts Type R 302, Type S 304, Type T 306, and REF #1 308. In some embodiments, a comparatively low 50% conversion temperature value is observed with the inclusion of a Nb—Zr—Al oxide mixture within catalysts Type R 302 and Type S 304 when compared to catalysts Type T 306 and REF #1 308, thereby indicating an improvement associated with the inclusion of Nb—Zr—Al oxide mixture in a first catalyst zone. It is also observed that catalyst Type T 306 compares favorably to catalyst REF #1 308 at a significantly reduced concentration of PGMs.

Figure 4:
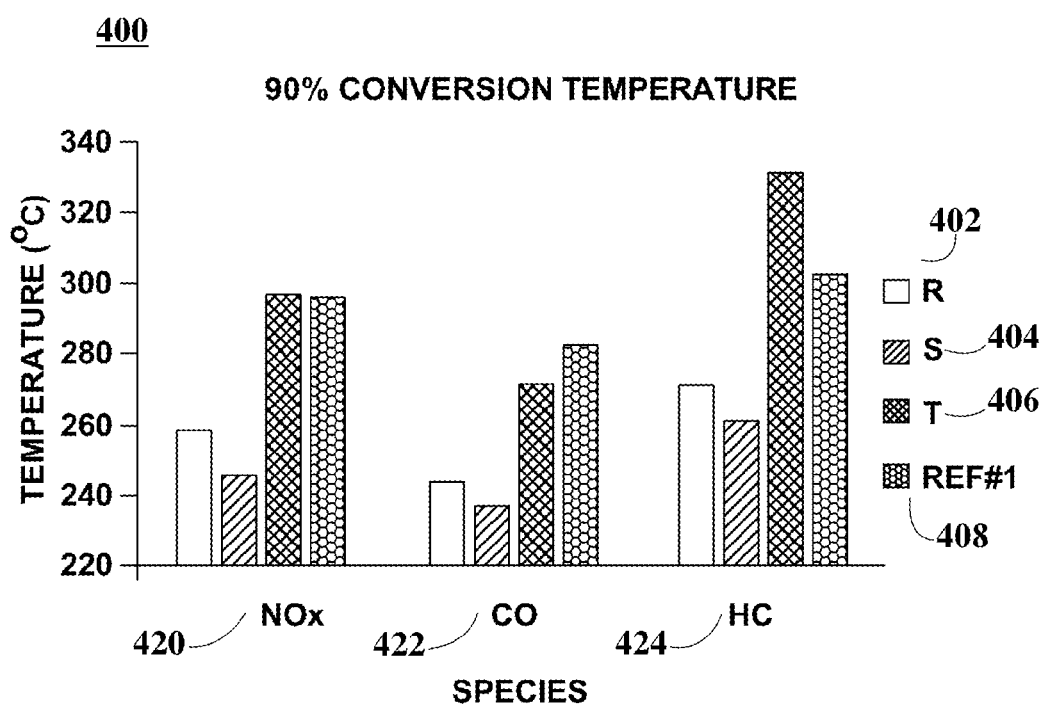
FIG. 4 is a graphical representation illustrating a comparison of T90 values of NOx, CO, and HC for REF #1 and Type R, S, and T Catalysts, according to an embodiment.

FIG. 4 is a graphical representation illustrating a comparison of T90 values of NOx, CO, and HC for REF #1 and Catalysts Type R, S, and T (see Table 1), according to an embodiment. In FIG. 4, T90 Chart 400 illustrates the 90% conversion temperature for NOx 420, CO 422, and HC 424 associated with each catalyst for catalysts Type R 402, Type S 404, Type T 406, and REF #1 408. In some embodiments, a comparatively low 90% conversion temperature value is observed with the inclusion of a Nb—Zr—Al oxide mixture within catalysts Type R 402 and Type S 404 when compared to catalysts Type T 406 and REF #1 408, thereby indicating an improvement associated with the inclusion of Nb—Zr—Al oxide mixture in a first catalyst zone. It is also observed that catalyst Type T 306 displays a substantially similar catalytic performance when compared to catalyst REF #1 308 at a significantly reduced concentration of PGMs.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:
1. A close-coupled converter system, comprising:
a first catalyst zone; and
a second catalyst zone;
wherein the first catalyst zone is configured to receive exhaust gases, process the received exhaust gases into first treated gases, and expel the first treated gases into the second catalyst zone;
wherein the second catalyst zone is configured to receive the first treated gases from the first catalyst zone, process the received first treated gases into second treated gases, and expel the second treated gases;
wherein the first catalyst zone comprises:
a first catalyst zone substrate;
a first catalyst zone washcoat deposited on the first catalyst zone substrate;
at least one first catalyst zone impregnation layer; and
a first catalyst zone overcoat;
wherein the first catalyst zone washcoat comprises a first catalyst zone first oxygen storage material including Cerium, Zirconium-Hafnium, Neodymium, and Yttrium, and a first catalyst zone support oxide;
wherein the at least one first catalyst zone impregnation layer comprises Pd, Ba, Ce, and Nd;
wherein the first catalyst zone overcoat comprises a first catalyst zone second oxygen storage material comprising Cerium, Zirconium-Hafnium, Neodymium, and Yttrium, and a first catalyst zone oxide mixture comprising Niobium, Zirconium-Hafnium, Alumina and Rhodium;
wherein the second catalyst zone comprises:
a second catalyst zone substrate;
a second catalyst zone washcoat deposited on the second catalyst zone substrate;
at least one second catalyst zone impregnation layer; and
a second catalyst zone overcoat;
wherein at the second catalyst zone overcoat comprises rhodium and iron.
2. The close-coupled converter system of claim 1, wherein the second catalyst zone overcoat comprises a second catalyst zone oxygen storage material, Fe, and Rh.
3. The close-coupled converter system of claim 1, wherein the at least one second catalyst zone impregnation layer comprises Pd, Ba, Ce, and Nd.
4. The close-coupled converter system of claim 1, wherein a first layer of the at least one first catalyst zone impregnation layer comprises about 22 g/ft³ to about 90 g/ft³ of palladium and about 115 g/ft³ to about 690 g/ft³ of barium.
5. The close-coupled converter system of claim 4, wherein a first layer of the at least one second catalyst zone impregnation layer comprises 25 g/ft³ of loaded palladium;

about 115 g/ft³ of loaded barium; about 105 g/ft³ of loaded cerium; and about 12 g/ft³ of loaded neodymium.

6. The close-coupled converter system of claim 1, wherein the first layer of the at least one first catalyst zone impregnation layer further comprises about 105 g/ft³ of loaded cerium and about 12 g/ft³ of loaded neodymium.

7. The close-coupled converter system of claim 1, wherein a second layer of the at least one first catalyst zone impregnation layer includes 0 g/ft³ to about 147 g/ft³ of loaded palladium.

8. The close-coupled converter system of claim 7, wherein a second layer of the at least one first catalyst zone impregnation layer includes 70 g/ft³ to about 147 g/ft³ of loaded palladium.

9. The close-coupled converter system of claim 7, wherein a first layer of the at least one second catalyst zone impregnation layer comprises 25 g/ft³ of loaded palladium; about 115 g/ft³ of loaded barium; about 105 g/ft³ of loaded cerium; and about 12 g/ft³ of loaded neodymium.

10. The close-coupled converter system of claim 1, wherein a first layer of the at least one second catalyst zone impregnation layer comprises 25 g/ft³ of loaded palladium; about 115 g/ft³ of loaded barium; about 105.8 g/ft³ of loaded cerium; and about 12 g/ft³ of loaded neodymium.

11. The close-coupled converter system of claim 1, wherein the first catalyst zone oxide mixture comprises about 10 wt % niobium oxide and about 20 wt % zirconia.

12. The close-coupled converter system of claim 1, wherein the first catalyst zone overcoat is loaded with about 3 g/ft³ to about 3 g/ft³ rhodium.

13. The close-coupled converter system of claim 1, wherein the first catalyst zone overcoat is loaded with about 15.1 g/ft³ to about 24 g/ft³ rhodium.

14. The close-coupled converter system of claim 1, wherein the second catalyst zone overcoat is loaded with about 3 g/ft³ to about 3 g/ft³ rhodium.

15. The close-coupled converter system of claim 1, wherein the second catalyst zone overcoat is loaded with about 210 g/ft³ iron.

16. The close-coupled converter system of claim 1, wherein the second catalyst zone second oxygen storage material comprises 31 wt % Cerium, about 58 wt % Zirconium-Hafnium, about 5 wt % Neodymium, and about 5 wt % Yttrium Oxide.

17. The close-coupled converter system of claim 1, wherein the first catalyst zone first oxygen storage material comprises 31 wt % Cerium, about 58 wt % Zirconium-Hafnium, about 5 wt % Neodymium, and about 5 wt % Yttrium Oxide.

18. The close-coupled converter system of claim 1, wherein the first catalyst zone washcoat comprises about 40 wt % of the first catalyst zone first oxygen storage material and about 60 wt % of the first catalyst zone support oxide and wherein the first catalyst zone support oxide is doped alumina.

19. The close-coupled converter system of claim 1, wherein, excluding the Rhodium, the first catalyst zone overcoat comprises about 40 wt % of the first catalyst zone second oxygen storage material and about 60 wt % of the catalyst zone oxide mixture.

20. The close-coupled converter system of claim 1, wherein the second catalyst zone washcoat comprises about 40 wt % of a second catalyst zone first oxygen storage material and about 60 wt % of a doped alumina.

* * * * *